United States Patent
Yates et al.

(10) Patent No.: US 7,497,083 B2
(45) Date of Patent: Mar. 3, 2009

(54) FUEL SUPPLY SYSTEM

(75) Inventors: Martin Kenneth Yates, East Haddon (GB); Daniel James Bickley, Solihull (GB); Michael Griffiths, Bromsgrove (GB)

(73) Assignee: Goodrich Control Systems Limited (GB)

( * ) Notice: Subject to any disclaimer, the term of this patent is extended or adjusted under 35 U.S.C. 154(b) by 541 days.

(21) Appl. No.: 11/284,081

(22) Filed: Nov. 21, 2005

(65) Prior Publication Data

US 2007/0113554 A1 May 24, 2007

(30) Foreign Application Priority Data

Nov. 24, 2004 (GB) .................................. 0425785.3

(51) Int. Cl.
*F02C 7/236* (2006.01)
(52) U.S. Cl. .......................................... 60/734; 417/62
(58) Field of Classification Search ............... 60/39.281, 60/243, 734; 417/62
See application file for complete search history.

(56) References Cited

U.S. PATENT DOCUMENTS

| | | | | | |
|---|---|---|---|---|---|
| 2,761,387 | A | * | 9/1956 | Gaubatz | 417/62 |
| 2,780,172 | A | * | 2/1957 | Coar | 417/62 |
| 3,011,308 | A | | 12/1961 | Wotring | |
| 3,026,929 | A | | 3/1962 | Burns | |

FOREIGN PATENT DOCUMENTS

GB 771837 4/1957

OTHER PUBLICATIONS

European Search Report dated Jan. 13, 2008.

* cited by examiner

*Primary Examiner*—Louis J Casaregola
(74) *Attorney, Agent, or Firm*—Andrus, Sceales, Starke & Sawall, LLP

(57) ABSTRACT

A fuel supply system for a gas turbine engine comprises a first positive displacement pump (16), a second positive displacement pump (27), said first and second positive displacement pumps (16, 27) being operable simultaneously for the supply of fuel from a low pressure source, and switching valve means (14) downstream of said first positive displacement pump (16) for changing a connection mode between said first and second positive displacement pumps (16, 27) between a series mode and a parallel mode.

10 Claims, 5 Drawing Sheets

FUEL SUPPLY SYSTEM

Figure 1:
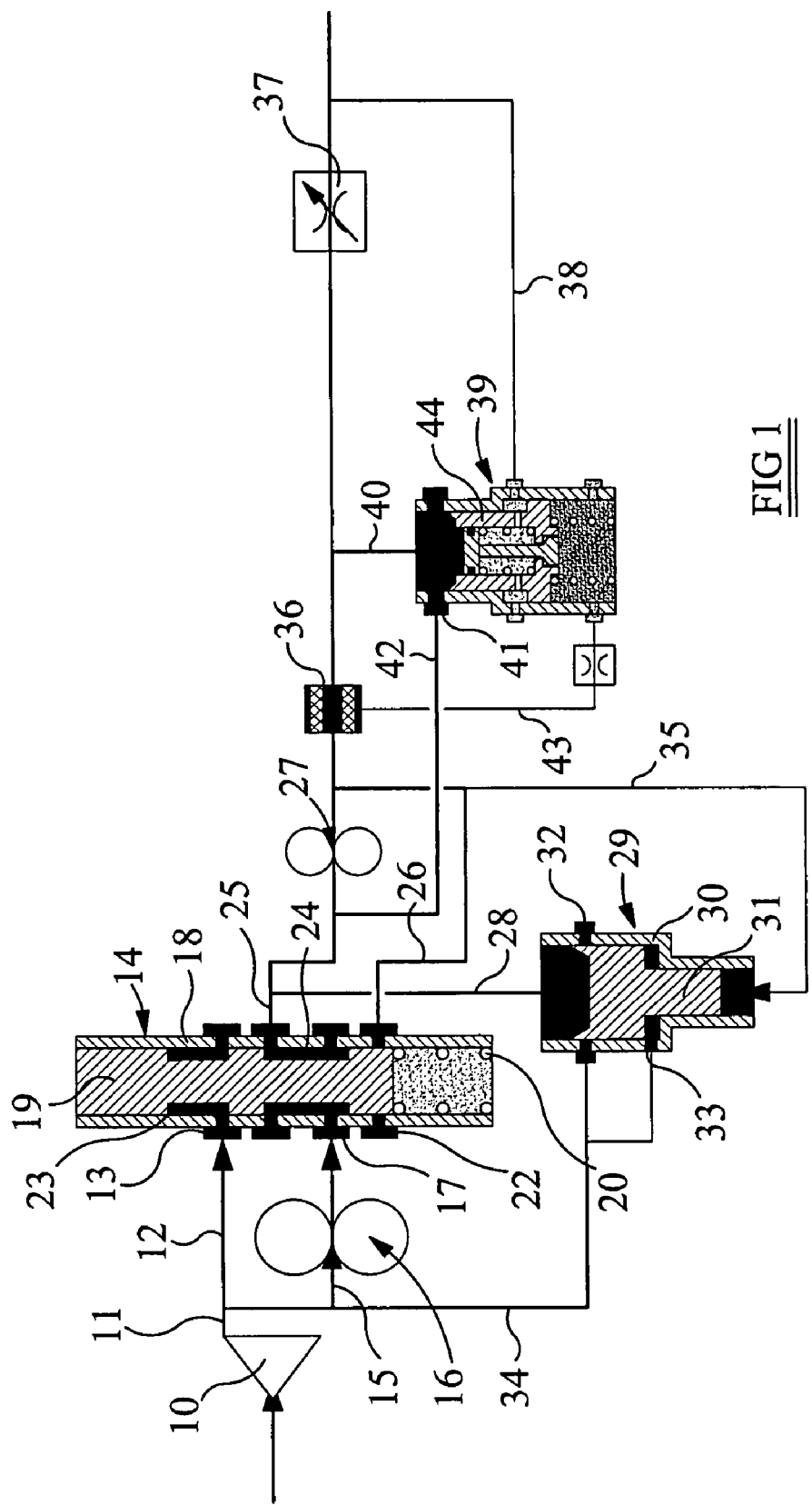

This invention relates to a fuel supply system for a gas turbine engine, primarily, but not exclusively, an aircraft gas turbine engine.

A conventional fuel supply system uses a positive displacement pump, for example a gear pump, driven from the gas turbine engine through the intermediary of an accessory gearbox, to provide fuel through a fuel metering system to the burners of the gas turbine engine. The positive displacement pump which, in the interests of clarity will be referred to herein as a "gear pump", receives fuel from a fuel supply through a low pressure pump or the like, and it will be recognised that the rotational speed of the gear pump, and thus the output of the pump is directly proportional to the shaft speed of the gas turbine engine. Generally the capacity and therefore the size of the pump is calculated on the basis of the maximum fuel flow which will be needed in use, and of course a safety margin is applied on top of that maximum. There will be many operating conditions, notably engine idle conditions where the output of the pump exceeds the demand of the engine.

Excess fuel from the pump outlet is spilled back to the low pressure side of the fuel system through a spill valve which is arranged to operate to maintain a substantially constant pressure drop across the fuel metering valve of the fuel metering system. A pressure raising and shut-off valve (PRSOV) is interposed between the metering valve and the engine burners, and ensures that the fuel system upstream of the PRSOV is pressurised to a sufficient level that ancillary equipment powered by fuel pressure, for example engine control vane actuators, can be operated. Additionally the PRSOV provides a means of isolating the gas turbine burners from the fuel supply system when the engine is to be shut-off.

With such a conventional system, the pump discharge pressure is set by:

a) The pressure drop across the metering valve in the Fuel Metering Unit (FMU).

b) The pressure drop across the PRSOV. At low flows, below cruise, the PRSOV sets a more or less constant pressure rise across the gear pump. At flows above cruise, the PRSOV is normally fully open and acts as a fixed restrictor such that the gear pump pressure rise varies with engine flow.

c) The pressure drop across the fixed size burner nozzles.

d) The combustion chamber back pressure, which is effectively the delivery pressure of the engine compressor.

This arrangement normally results in either the take-off or the idle descent condition being the most arduous for the pump bearings. The reasons for this are:

i) At take-off, the system pressures and hence bearing loads are high. However the high drive speed and the relatively low fuel temperature results in the bearings having good load carrying capacity.

ii) At idle descent, the system pressures and hence bearing loads, are low compared with take-off. However the fuel temperature is high, and this results in large bearing clearances and low fuel viscosity, which, coupled with the low drive speed, significantly reduces the load carrying capacity of the bearings.

Both of the above conditions are of relatively short duration. At the cruise condition, however, where the pump operates for most of its life, the pump speed is relatively high, the pressures are between those at take-off and idle, and the fuel temperatures are not particularly high compared with idle descent. All of these factors mean that on conventional fuel systems, the cruise condition is not particularly arduous for the bearings.

With 'new generation' fuel systems, however, the size of the burner nozzles is not fixed, but is changed, either continuously or discretely as part of the staged combustion system to enhance the performance of the engine. This staged combustion can result in very high fuel pressures, potentially higher than at take-off, at some cruise conditions. This leads to two undesirable effects. Firstly the bearing loads are significantly higher than on conventional systems because of the higher pressures. Secondly as flow in excess of engine demand is recirculated around the pump, considerable waste heat is rejected to the fuel due to the high spill flow and high pressures, resulting in significantly higher fuel temperatures.

The overall effect of increased bearing loads and fuel temperatures, coupled with the pump spending a considerable proportion of its life at that condition, is that the cruise condition becomes more arduous for the pump bearings, resulting in reduced life or the need to change bearing design, possibly resulting in a heavier pump.

In a conventional system, the problem of waste heat rejection to the fuel is most critical in the idle descent condition. One solution to the problem of reducing this waste heat rejection is by utilising two gear pumps, with different displacements, operating in parallel. U.S. Pat. No. 4,245,964 discloses a fuel supply system incorporating such a parallel pump arrangement.

To solve the above-mentioned waste heat rejection problem, it is arranged that at start, take-off and climb both pumps are pressurised and deliver flow to the engine. At all other conditions the flow from the larger displacement pump is not pressurised and is recirculated at very low pressure. Hence it does not reject very much waste heat into the fuel. The smaller displacement pump is pressurised at all times, and any flow from this pump in excess of engine demand is recirculated, this time across a higher pressure drop. The smaller displacement pump does not reject significant heat to the fuel, however, because there is relatively little spill flow. Unloading of the larger displacement pump at idle descent is achieved using a combining spill valve (CSV).

An object of the invention is to provide a fuel supply system in which the operating conditions for the pump bearings are improved as compared to known systems. The improvement is most marked at high pressure cruise.

According to the present invention there is provided a fuel supply system for a gas turbine engine, the system comprising a first positive displacement pump, a second positive displacement pump, said first and second positive displacement pumps being operable simultaneously for the supply of fuel from a low pressure source, and switching valve means downstream of said first positive displacement pump for changing a connection mode between said first and second positive displacement pumps from a series mode to a parallel mode or vice versa.

In said series connection mode, fuel from the low pressure source is supplied to said second positive displacement pump only from said first positive displacement pump, whereas in said parallel connection mode fuel supplied to said second positive displacement pump is not from said first positive displacement pump.

Preferably the first positive displacement pump has a higher capacity than the second positive displacement pump. This ensures that flow from the higher capacity pump can be split by a pressure split regulating valve to maintain the pressure drop across both pumps in the required ratio. Typically the split in the displacement would be in the range 55/45 to 50/50.

Preferably in the series connection mode, the pressure split regulating valve senses the pressure rise across both of said positive displacement pumps and spills flow around said first positive displacement pump to maintain a fixed ratio of pressure rises across the two positive displacement pumps. In this connection mode a spill valve recirculates flow around said second positive displacement pump to maintain a fixed pressure drop across a metering valve.

Preferably in the parallel connection mode, said pressure split regulating valve closes, so that it no longer spills flow. Desirably flow from the first positive displacement pump is routed via said switching valve means to meet delivery flow from said second positive displacement pump. Conveniently said spill valve recirculates from both positive displacement pumps to maintain said fixed pressure drop across the metering valve.

Preferably the system of the invention includes a combining spill valve for unloading of said first positive displacement pump in the parallel connection mode. This unloading is advantageously effected at idle descent and low pressure cruise, but not at start or take off, where preferably flow from the first positive displacement pump is forced through a non-return valve to join flow from said second positive displacement pump, so that both positive displacement pumps are loaded. Preferably in the series connection mode the combining spill valve controls the pressure drop across the metering valve by spilling flow back to the inlet of the second positive displacement pump.

Figure 2:
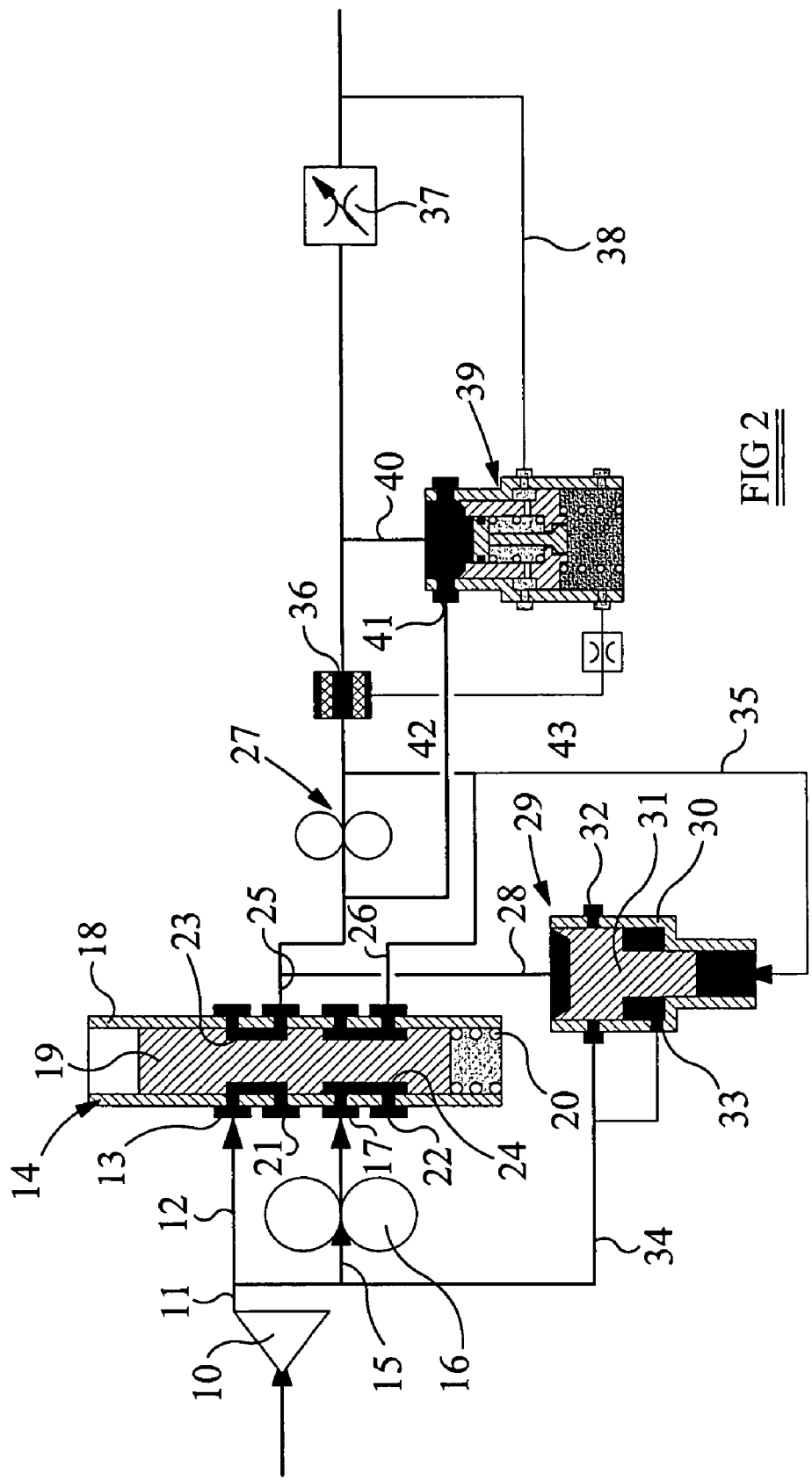
Figure 3:
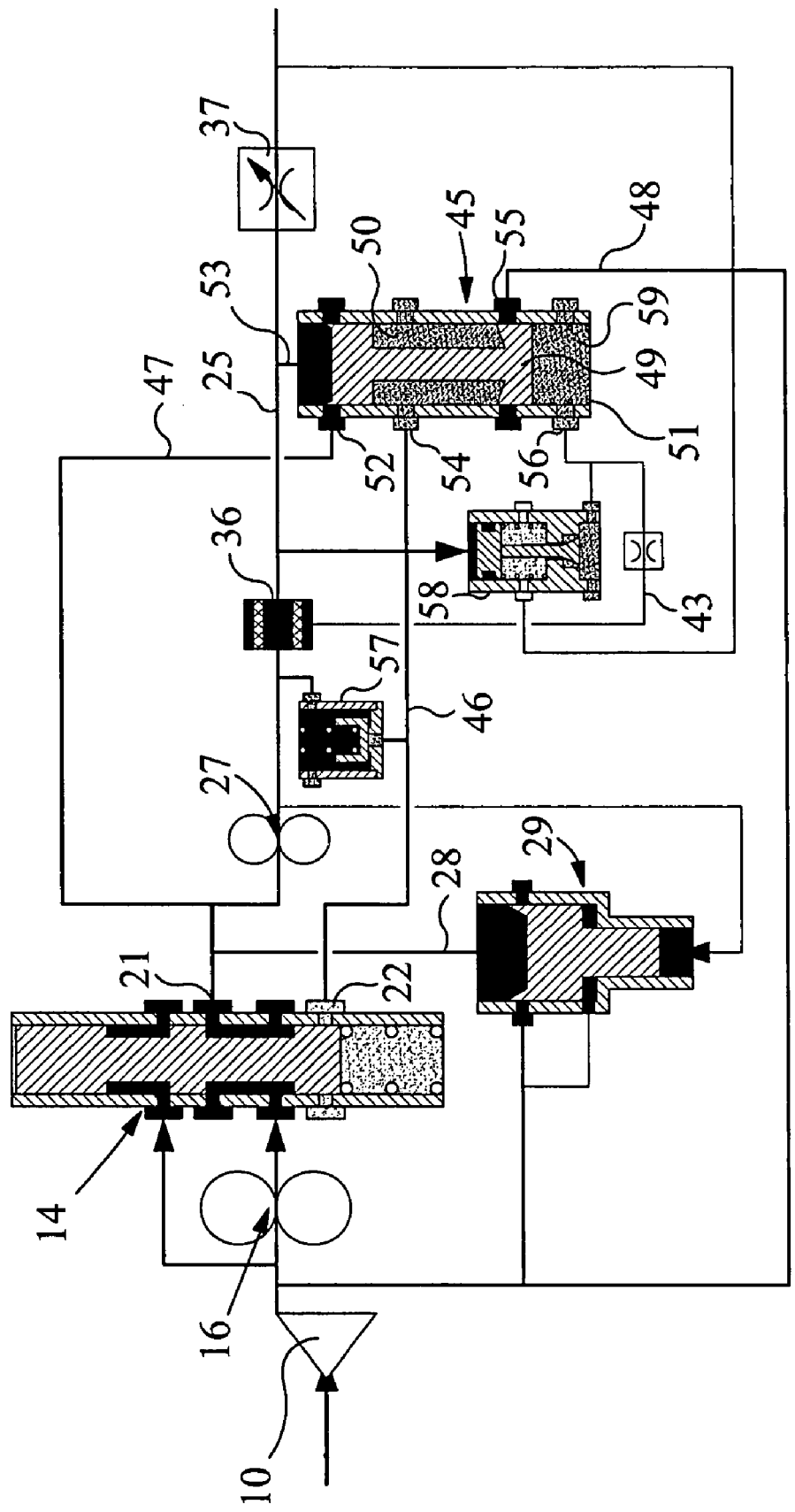
Figure 4:
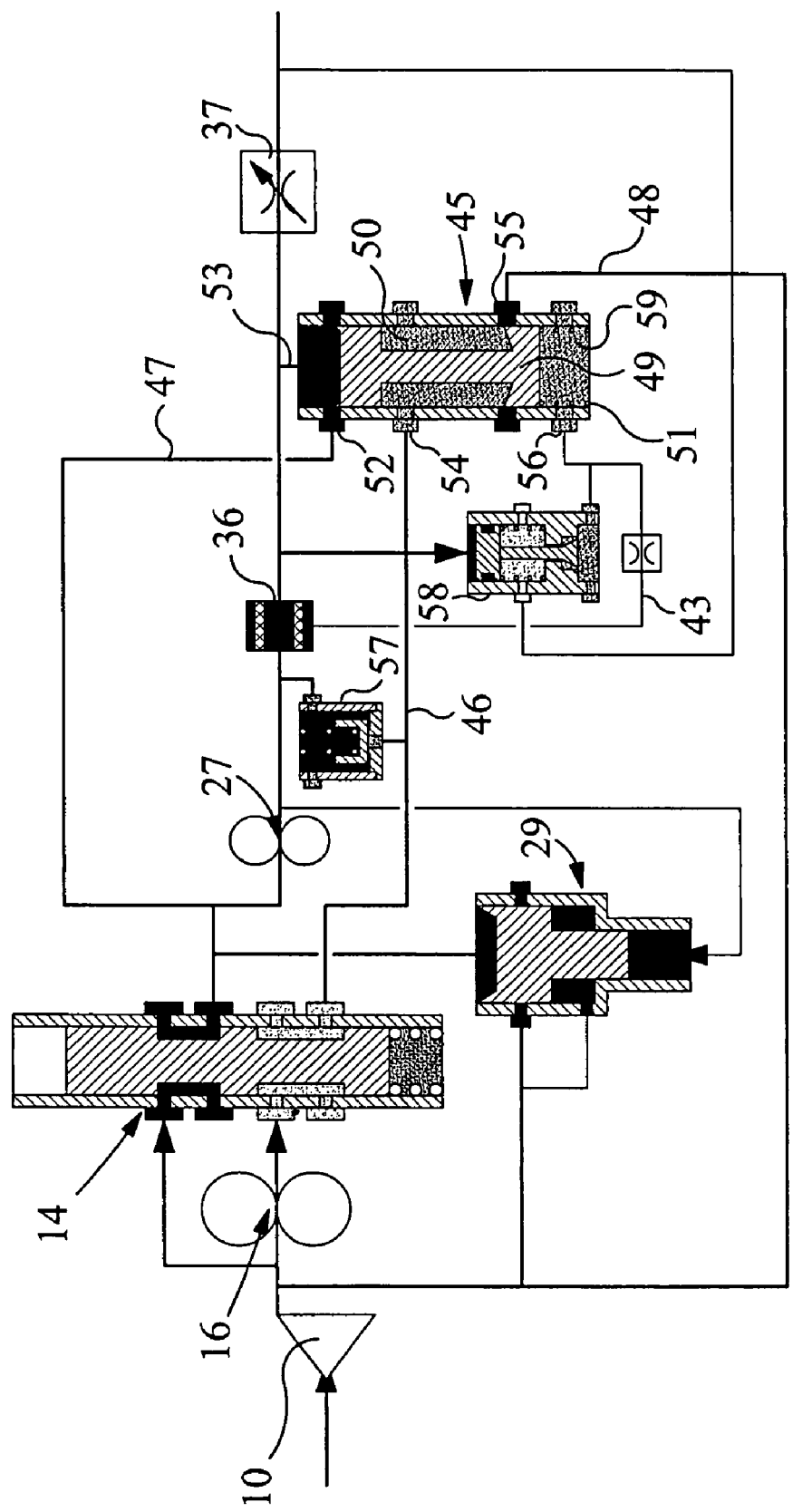
Figure 5:
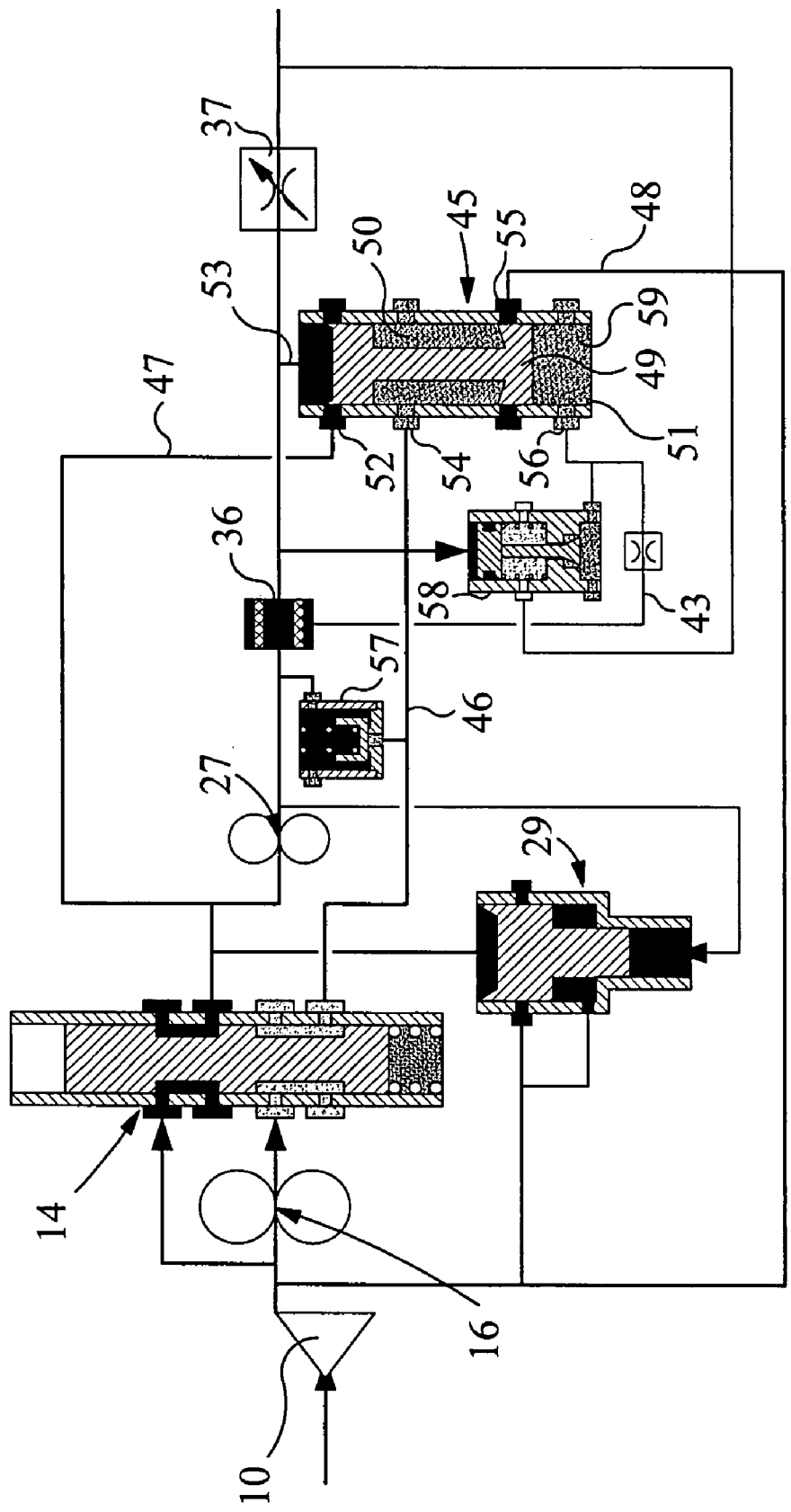

The invention will now be described, by way of example, with reference to the accompanying drawings, in which:

FIG. 1 is a diagrammatic representation of a fuel supply system for a gas turbine engine in accordance with a first embodiment of the invention, with first and second positive displacement pumps in a series connection mode, FIG. 2 is an identical view to FIG. 1, but shows the pumps in a parallel connection mode, FIG. 3 is a diagrammatic representation of a fuel supply system for a gas turbine engine in accordance with a second embodiment of the invention, with first and second positive displacement pumps in a series connection mode, FIG. 4 is an identical view to FIG. 3, but shows the pumps in a parallel connection mode, with the first positive displacement pump unloaded, and FIG. 5 is an identical view to FIG. 4, but with the first positive displacement pump loaded.

Referring first to FIGS. 1 and 2 of the drawings, a fuel supply system includes a low pressure pump 10 which, in use, supplies fuel from a reservoir to a low pressure line 11. This line 11 is divided to provide a line 12 connected to a port 13 of a switching valve 14, and a line 15 connected to the inlet port of a first positive displacement pump 16, which whilst it can be of any suitable form, is in this embodiment, a gear pump. The outlet port of the pump 16 is connected to a further port 17 of the switching valve 14. The switching valve 14 includes a hollow cylindrical housing 18 of circular cross-section, and received as a close sliding fit in the housing 18 is a cylindrical metal control spool 19. The length of the spool 19 is less than the length of the housing 18 and a compression spring 20 in the bottom of the housing 18 acts upon a lower surface of the spool 19 so as to bias it upwardly to the position shown in FIG. 1.

The housing 18 has two inlet ports and two corresponding outlet ports respectively, it being seen in the drawings that, in this embodiment, each port is defined by an annular gallery in around housing 18 communicating with the respective region in the interior of the housing by way of a plurality of circumferentially spaced radial drillings through the wall of the housing. As shown in FIGS. 1 and 2, the port 13 is the uppermost port of the two inlet ports in the housing 18, and below this port 13 is a port 21. Below this is the further port 17, whilst below this is a still further port 22.

The spool 19 includes two axially spaced, circumferential annular grooves 23, 24 respectively. The axial positioning of these annular grooves along the length of the spool, and the length of the annular grooves themselves is such in relation to the intended range of movement of the spool relative to the housing that the annular grooves 23, 24 will interconnect different ports of the housing 18 depending on the axial position of the spool 19 in the housing 18.

Accordingly with the spool 19 biased upwardly by the spring 20 to its end position shown in FIG. 1, it will be understood that flow from the pump 10, through lines 11 and 12, the port 13 and the annular groove 23, is cut off from the outlet port 21. For the annular groove 24, however, it can be seen from FIG. 1 that this interconnects the port 21 and the further port 17. Accordingly fuel from the gear pump 16 flows to the further port 17 and thence to the annular groove 24, where, by way of the interconnection referred to, fuel can leave the switching valve 14 by way of the outlet port 21 to an outlet line 25. Finally it can be seen from FIGS. 1 and 2 that there is no line to the outlet port 22, which is blocked off.

When the spool 19 is moved downwardly against the spring 20, as shown in FIG. 2, then the connections effected by the annular grooves 23 and 24 change. Accordingly as shown in FIG. 2, the annular groove 23 now interconnects the inlet port 13 to the outlet port 21, so that fuel can flow from the line 12 to the outlet line 25. Similarly the annular groove 24 interconnects the further inlet port 17 to the outlet port 22 so that fuel can flow from the gear pump 16 to an outlet line 26, which joins line 25 downstream of gear pump 27.

The switching valve is used, as will be described hereinafter, for changing the connection mode between the first positive displacement pump 16 and a smaller capacity second positive displacement pump 27 from a series mode to a parallel mode or vice versa. As with the first positive displacement pump 16, the second positive displacement pump is in this embodiment, a gear pump. The exact mode of operation of the switching valve dependent upon the operation of the fuel nozzles of the gas turbine engine with which the fuel supply system is used. In the embodiment shown in FIGS. 1 and 2, it is assumed that the fuel nozzles are hydraulically actuated, and the nozzle fueldraulic signal is used to actuate the spool of the switching valve 14 so that when high fuel pressures occur at cruise conditions of the engine, the valve 14 operates the pumps 16 and 27 in series mode. Other signals, either electrical, mechanical, pneumatic or hydraulic could be used separately or in conjunction with each other to actuate the switching valve.

As shown in FIGS. 1 and 2, the gear pump 27 is in the line 25 downstream of the switching valve 14. Between the valve 14 and the gear pump 27, a line 28 is branched off from the line 25, this line 28 being connected to an upper chamber of a pressure split regulating valve 29. This valve 29 is formed with a housing 30 in which a piston 31 is a close sliding fit. Towards its upper end, as viewed in the drawings, the housing is provided with an inlet chamber, an outlet port 32 and respective associated radial drillings through a wall of the housing 30, whilst just above a position where the housing is stepped down along its axial length, there is a further inlet port 33 in the form of a radial drilling through the housing 30. As shown in FIGS. 1 and 2, the piston 31 is itself stepped down in the same manner as the housing 30.

Connected to the outlet port 32 is a spill return line 34 which is connected to the line 15 upstream of the gear pump 16, and also to the line 11. Additionally there is a connection from the port 33 to the return line 34. Finally with regard to the valve 29, it will be noted from FIGS. 1 and 2 that a line 35 taken from the line 26 is connected to the end of the lower, stepped-down part of the valve 29 to provide a pressure acting on the piston 31, so as, with the pressure in the other chambers defined between the piston and the housing, to control the position of the piston in the housing, and thus determine whether the port 32 is open or closed.

Downstream of the pump 27, there is provided a filter 36, and downstream of this, also in the line 25, is a conventional metering valve 37. A line 38 from downstream of the metering valve is connected to an inlet port of a conventional pressure drop and spill valve 39, which is used to maintain a fixed pressure drop across the metering valve 37 by spilling flow in excess of engine requirements. As illustrated, the upper part of the valve 39 receives flow from the line 25 via a line 40 which is taken from the line 25 between the filter 36 and metering valve 37. A piston in the valve 39 controls opening or closing of an outlet 41 at the top of the valve 39 which, when opened, returns flow to a position upstream of the gear pump 27 via a line 42. A line 43 is connected from the filter 36 to a port at the bottom of the valve 39, with the relative pressures in the lines 38 and 43 serving to control the position of the piston 44 in the valve 39, and consequentially flow through the outlet 41 of the valve 39. As will be described, the exact operation of the valve 39 depends on whether the system is operating in parallel or series mode.

FIG. 1 shows the system operating in series mode, and here the spool 19 is positioned so that the only flow through the valve 14 is from the gear pump 16, with fuel from the pump passing through port 17 and the annular groove 24 to the outlet line 25. Accordingly all of the low pressure stage delivery flow is to the gear pump 16. Flow from this pump is then routed by the switching valve to the second, smaller displacement, gear pump 27. With this arrangement the valve 29 senses the pressure rise across both of the gear pumps, and as a result its outlet port 32 is open so that fuel can spill from the line 28 to the spill return line 34, and then back to the inlet of the gear pump 16 to maintain a fixed ratio of pressure rises across the two pumps. The valve 39 recirculates a second spill flow around the gear pump 27 by way of the lines 40 and 42 to maintain fixed pressure drop across the metering valve 37.

FIG. 2 shows the arrangement when the spool 19 has moved to position in its housing where it compresses the spring 20. As can be seen here, the annular groove 23 interconnects the port 13 to outlet port 21 so that low pressure fuel is supplied to the inlet of the gear pump 27 via line 25. At the same time low pressure fuel is also supplied to the gear pump 16. The delivery flow from gear pump 16 is supplied through the further port 17 and out from the outlet port 22 into the line 26, from which it is fed to the line 25 at a position downstream of the gear pump 27 ahead of the filter 36. Accordingly this is the parallel connection mode operation for the two gear pumps, in which the switching valve 14 routes low pressure fuel flow to the inlets of both gear pumps. The pressure split regulating valve 29 is now closed because it has high pressure at its lower end, as viewed in FIGS. 1 and 2, and low pressure in both of its other chambers. As a result the piston 31 moves upwardly from its FIG. 1 position so as to close the outlet port 32. The spill valve 39 remains open, as with the FIG. 1 arrangement, so as to recirculate flow from both pumps to maintain a fixed pressure drop across the metering valve 37.

The invention disclosed in FIGS. 1 and 2, tackles the problem of arduous bearing conditions at cruise by splitting the high pressure rise between the two gear pumps operating in series. At start, take-off and climb, the two pumps will operate in parallel since high delivery flows are required under those conditions. The split in displacement would be in the range 55/45 to 50/50. It is important that the first pump has a slightly higher capacity than the second pump so that flow from the first pump can be spilled by the pressure split regulating valve to maintain the pressure rises across both pumps in the required ratio. With the arrangement described in series mode, less heat is rejected to the fuel than with a conventional system, because the spill flow is considerably less, being the difference between the large pump's free flow and the engine burnt flow requirement. A reduction in pressure, and hence bearing loads, coupled with a reduced fuel temperature significantly improves the operating conditions for the bearings.

Whilst the arrangement shown in FIGS. 1 and 2 represents an improvement over conventional systems, and tackles the problem of arduous bearing conditions at cruise, the series connection of the two gear pumps is principally effective at high pressure cruise. At idle descent and low pressure cruise, with the gear pumps acting in parallel, pressure rise across the gear pump 16 would be the same as that applied across the gear pump 27, giving higher recirculation losses and higher fuel temperatures for the system. The alternative embodiment of the invention shown in FIGS. 3 to 5 is proposed to overcome this problem by providing for means to unload the gear pump 16 at idle descent and low pressure cruise. As shown in FIGS. 3 to 5, the means is in the form of a combining spill valve (CSV) 45. With both the switching valve 14 and the combining spill valve 45, the system can combine pumps in series with both pumps loaded and in parallel with the larger pump either loaded or unloaded. An example of the flight conditions at which these operating modes might be used is given below.

| Gear pump combination | Condition |
| --- | --- |
| Series | High pressure cruise |
| Parallel without CSV unloading | Start, take-off |
| Parallel with CSV unloading | Idle descent, low pressure cruise |

As can be seen from FIGS. 3 and 5, the system incorporating a combining spill valve 45 has many features in common with the system shown in FIGS. 1 and 2, and the same numerals will be used for features in common.

The combined pressure drop controller and spill valve of FIGS. 1 and 2 has been replaced by a pressure drop control valve 58 and a separate combining spill valve 45. The combination of these valves serves to maintain a constant pressure drop across the metering valve 37. This is achieved by valve 58 causing the pressure in chamber 59 of valve 45 to vary in response to changes in pressure across the metering valve 37. Changes in pressure within chamber 59 of combining spill valve 45 will cause the position of spool 49 to vary and depending on its position, fuel may be spilled from line 25 via inlet line 53 to the input of pump 27 via outlet port 52 and line 47 and from the line 46 through an annular groove 50 in a spool 49 of the combining spill valve 45 to the input of the pump 16 via outlet port 55 and line 48.

For the arrangements of FIGS. 3, 4 and 5, outlet port 22 of switching valve 14 (FIGS. 1 and 2) is now connected to valve 45, via line 46, as is outlet port 21 via lines 25 and pump 27.

Thus as shown in FIGS. 3 to 5, it can be seen that the valve 45 has a housing with a series of axially separated inlets and outlets with associated radial drillings, said spool 49 moving axially within the housing. The groove 50 is a large circumferential annular groove in the spool 49, which groove selectively provides communication between various ones of the inlet and outlet ports in the housing as the spool moves axially in the housing. As with the valve 14, there is a compression spring 51 acting on the lower end of the spool to urge it upwardly, as the valve is shown oriented in the drawings.

At its upper end, the valve 45 has said outlet port 52 to which the line 47 is connected, with said inlet line 53 from line 25 at a position downstream of the filter 36 being connected to the chamber at the top of the spool 49 so that fuel flow can spill from the line 25, through this chamber and thence out from the outlet 52 into the line 47 to be returned upstream of the pump 27. The line 46 is connected to an inlet port 54 of the valve 45 and this inlet, is in communication with the annular groove 50 both in the position of the spool 49 shown in FIGS. 3 and 5 and also in the alternative position shown in FIG. 4. The line 48 is connected to the outlet port 55 positioned below the inlet port 54. This outlet port 55 is blocked by part of the spool 49 when the spool is in its FIGS. 3 and 5 positions, but is uncovered when the spool is in its FIG. 4 position to allow spill of fuel from the line 46, through the inlet port 54, the annular groove 50 and the outlet port 55 via the line 48 back to the inlet of the pump 16. Finally, the line 43 is extended to a lower port 56 of the valve 45, this port communicating with the chamber at the bottom of the spool in which the spring 51 is disposed.

Firstly considering FIG. 3, it will be understood that in this mode the switching valve 14 is in the same position as shown in FIG. 1, so that the gear pump 16 and the gear pump 27 are connected in series. Accordingly all of the fuel flow from the pump 10 passes through the gear pump 16 and is routed by the switching valve along the line 25 extending from the outlet port 21. Fuel supplied by the pump 27 flows along line 53 into the chamber at the top of the spool 49, and with the outlet 52 open, as shown in FIG. 3, spill takes place along the line 47 back to the inlet of the pump 27. Accordingly in this mode, the combination of valve 45 and valve 58 controls pressure drop across the metering valve 37 by spilling flow through the upper spill port 52 as described. The line 46 connecting the switching valve 14 to the combining spill valve 45 is blocked off at the switching valve, such that opening of the lower spill port of the valve 45 has negligible effect on system operation. Accordingly in this mode, the system operates in an identical manner to the embodiment shown in FIG. 1, with fuel also being spilt around the gear pump 16 via line 28 to the valve 29 and outflow from said valve through the outlet port 32. As mentioned above, this arrangement is suitable for high pressure cruise.

Also as mentioned above, it is desirable to unload the larger gear pump 16 during idle descent and low pressure cruise and FIG. 4 shows the operating system in these flight conditions. Firstly it will be noted that the switching valve is now in the position shown in the embodiment of FIG. 2, so that the gear pumps 16 and 27 are operating in parallel. The other main difference from what is shown in FIG. 3, is that at high spill flows through the port 52 of the valve 45, the lower spill port 55 will be open, due to the spool 49 having moved downwardly from its FIG. 3 position. Accordingly there is now a flow path along line 48 in conjunction with the line 46, from the outlet of the gear pump 16 back to its inlet. The flow path is designed to minimise the restriction to flow, and therefore minimises the loading on the pump in this condition. Without this unloading, as stated above, the pressure rise across the pump 16 would be the same as that across the pump 27, giving higher recirculation losses and higher fuel temperatures for the system. It can be seen that in the FIG. 4 condition there is the same spill of fuel back across the pump 27 as with the FIG. 3 condition, so that there is a fixed pressure drop maintained across the metering valve 37.

Prior to describing the condition shown in FIG. 5, it will be noted that between the lines 25 and 46 is arranged a non-return valve 57, with an outlet therefrom to the line 25 at a position between the pump 27 and the filter 36. In relation to FIG. 5, at low spill flows through the upper spill port of the valve 45, i.e. with the spool 49 moved upwards so as partially to close the outlet 52, the lower spill port 55 will be closed, thereby blocking the flow path from the outlet of the gear pump 16 along line 46 back to its inlet along line 48. Accordingly as a result the flow from the gear pump 16 along line 46 will be forced through the non-return valve 57 to join with the flow from the gear pump 27. In this mode the gear pumps are operating in parallel with both pumps loaded. The system, in this mode, is operating in an identical manner to that shown for the first embodiment in FIG. 2. As mentioned above, this arrangement would be suitable for start and take-off in that the pumps are operating in parallel, but without any unloading by way of the combining spill valve 45.

Accordingly with both embodiments of the present invention a system is provided in which the operating conditions for the pump bearings are significantly improved.

The invention claimed is:

1. A fuel supply system for a gas turbine engine, the system comprising a first positive displacement pump, a second positive displacement pump, said first and second positive displacement pumps being operable simultaneously for the supply of fuel from a low pressure source, switching valve means downstream of said first positive displacement pump for changing a connection mode between said first and second positive displacement pumps between a series mode and a parallel mode, and a pressure split regulating valve to maintain the pressure difference across both pumps in a required ratio.

2. A system according to claim 1, wherein the first positive displacement pump has a higher capacity than the second positive displacement pump.

3. A system according to claim 1, wherein the pressure split regulating valve maintains the pressure difference ratio across the pumps in the range of 55/45 to 50/50.

4. A system according to claim 1, wherein the pressure split regulating valve comprises a valve element movable in response to changes in the difference in pressure at an inlet and an outlet of the second pump and operable to spill fluid to an inlet of the first pump when the difference in pressure is below a predetermined level.

5. A system according to claim 4, wherein in the parallel connection mode, said pressure split regulating valve closes.

6. A system according to claim 1, further comprising a spill valve arranged to recirculate flow around said second positive displacement pump to maintain a fixed pressure drop across a metering valve.

7. A system according to claim 6, wherein said spill valve re-circulates fluid from both positive displacement pumps to maintain said fixed pressure drop across the metering valve.

8. A system according to claim 6, wherein when operating in the parallel connection mode, flow from the first pump is routed by the switching valve means to join the flow delivered by the second pump.

9. A system according to claim 6, wherein the spill valve comprises a combining spill valve for unloading of said first positive displacement pump in the parallel connection mode.

10. A system according to claim 9, further comprising a non-return valve through which fluid is forced by the first pump to join flow from said second positive displacement pump when the first pump is not unloaded in the parallel connection mode.

* * * * *